United States Patent [19]

Parma

[11] 4,050,107
[45] Sept. 27, 1977

[54] TOOL FOR TRUCK OPERATORS

[76] Inventor: John N. Parma, 6749 Lincoln Green Road, Holland, Ohio 43528

[21] Appl. No.: 682,142

[22] Filed: Apr. 30, 1976

[51] Int. Cl.² ............................................. B25F 1/04
[52] U.S. Cl. ............................................. 7/1 E; 7/8; 294/24
[58] Field of Search ................. 7/1 G, 8, 1 R, 9, 1 E; 81/177 A; 254/131; 294/24, 19; 33/126.7 R

[56] References Cited

U.S. PATENT DOCUMENTS

| 1,239,688 | 9/1917 | Harris | 33/126.7 R |
| 1,437,211 | 11/1922 | Yocom | 7/1 G |
| 1,577,490 | 3/1926 | Poe | 7/1 G |
| 3,644,951 | 2/1972 | Colburn | 294/24 |
| 3,843,981 | 10/1974 | Verest | 294/24 |

FOREIGN PATENT DOCUMENTS

| 840,607 | 6/1952 | Germany | 33/126.7 R |

Primary Examiner—James L. Jones, Jr.
Assistant Examiner—Roscoe V. Parker
Attorney, Agent, or Firm—Owen, Purdue, Emch & Barker

[57] ABSTRACT

A combination tool particularly adapted for use by operators of semi-trailer trucks. The tool includes an elongate hollow body of rigid material having a pivoted handle or bail on one end and a weight at the other end circumjacent the body. An axially slidable hook protrudes from the weighted end for use in operation of a fifth wheel hitch when extended. An extensible graduated depth gauge is telescopically positioned within the body at the handle end which, when extended, is a depth-type fuel gauge for checking fuel depth in truck tanks. The pivoted handle may be swung away from its axial position to permit extension of the depth gauge and a secondary tool grip is provided circumjacent the body of the tool at the handle end thereof.

1 Claim, 5 Drawing Figures

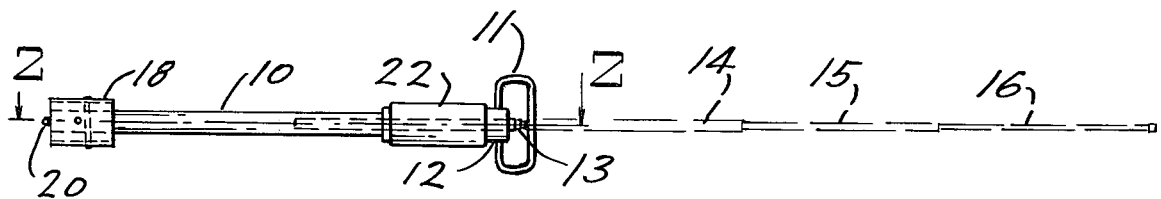
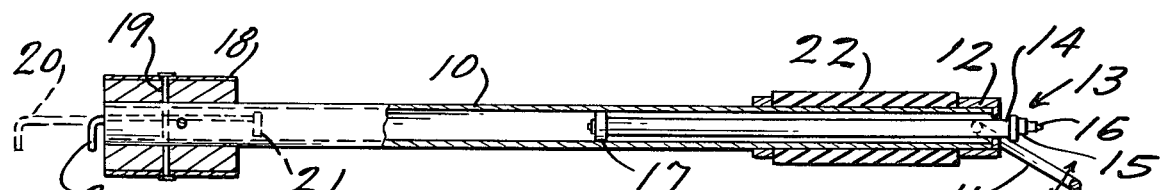
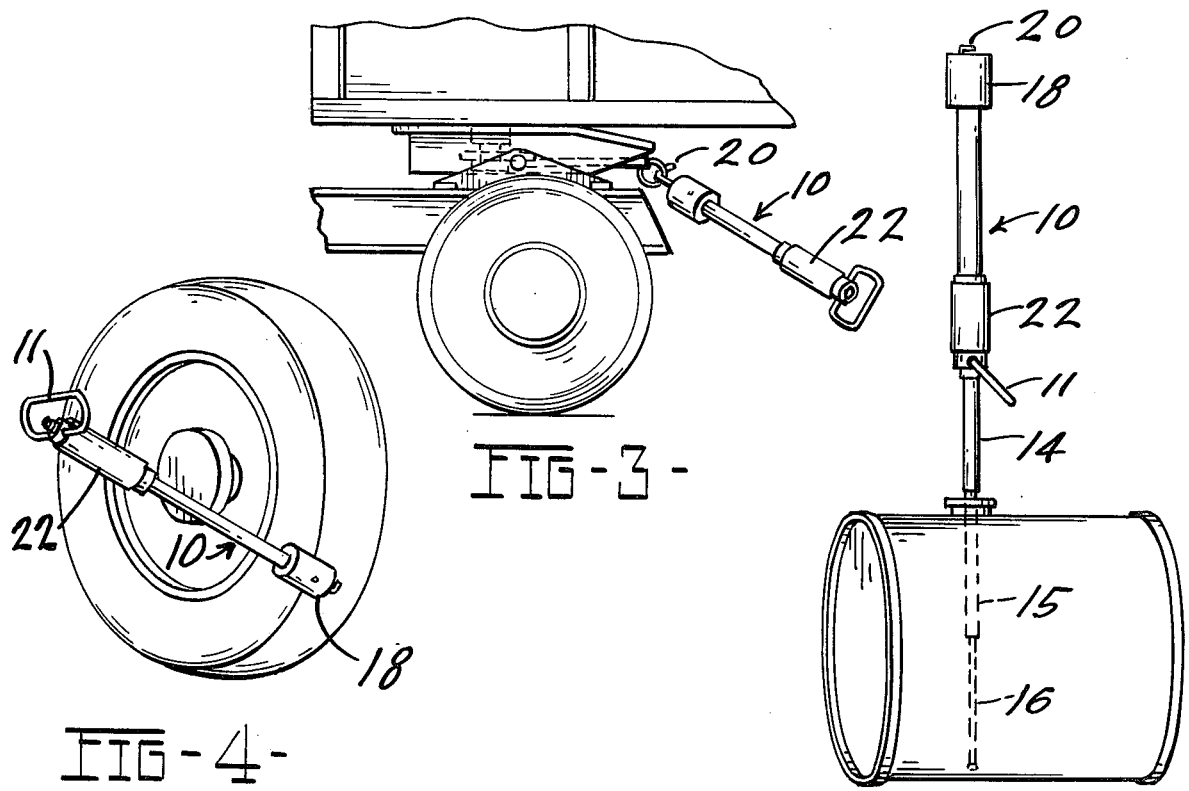

TOOL FOR TRUCK OPERATORS

This invention relates to a combination tool, particularly adapted for use by over-the-road semi-trailer truck operators. More particularly, it is designed as a simple combination tool for use by operators in performing the most common over-the-road operational functions such as adjustment of the truck hitch, checking tire inflation and checking fuel supply.

While separate tools have been available to a truck operator for a number of years for performing certain functions, the need for a single and simple combination tool has existed, particularly since over-the-road truck drivers have limited space for hauling maintenance gear, and are often faced with emergency situations where lack of light and time to check a particular tire or other component makes desirable the use of a simple tool which is readily available. By means of the instant invention, three of the most common functions can be performed with a single tool which may also serve as a general billy club or tap for making various other adjustments.

Other objects and advantages of the invention will become apparent from the followng detailed description of a preferred embodiment thereof, with reference being made to the accompanying drawings in which:

FIG. 1 is a view in elevation of the tool of my invention;

FIG. 2 is a cross sectional view of the same tool shown in FIG. 1

FIG. 3 is a simplified view illustrating one use of the tool;

FIG. 4 is a simplified view illustrating another use of the tool; and

FIG. 5 is a simplified view showing still another use of the tool.

Referring first to FIGS. 1 and 2, the tool includes an elongate body 10 which, preferably is fabricated from a tubular material such as steel or aluminum, but could also be fabricated of a rigid non-metallic material such as rigid plastic pipe. At one end of the body 10 is a pivoted handle or bail 11 which is secured to a ferrule or sleeve 12 in a manner well known to those skilled in the art. The ferrule or sleeve 12 may be press-fit or otherwise secured over the end of the body 10. The handle 11 is moveable about its pivot axis in the direction shown by the arrow in FIG. 2 and can be swung on either side around the one end of the body 10. Extending outwardly from the one end of the body 10 is a telescoping gauge 13 having sections 14, 15 and 16 of respectively decreased size which, when fully extended as shown in dotted line in FIG. 1, extend well beyond the end of the body 10 to provide a depth gauge for truck fuel tanks. Each of the sections 14–16 is graduated either in linear measurements such as inches or centimeters or may be graduated in volume measurements such as gallons or liters if adapted to a particular size of fuel tank. As shown in FIGS. 1 and 2, when the sections 14–16 are fully telescoped, the remote end of the outermost section 16 lies well within the handle 11 so that the handle can be held and manipulated without interference from the telescoping depth gauge 13. The innermost end of the section 14 is fitted with a stop member 17 which, when fully extended or pulled to the right as shown in FIGS. 1 and 2, bears against the innermost edges of the end flange on the ferrule 12 to prevent its removal from the tool.

At the other end of the tool is a weight 18 which preferably comprises a heavy sleeve of resilient but firm material, such as hard rubber, which is positioned circumjacent the other end of the body 10. The sleeve 18 may be press-fit on the body or, if desired, can be riveted by a transverse rivet or pin 19 as shown in FIG. 2. Extending coaxially from the other end of the body 10 is an extensible hook 20 which, in retracted position, as shown in the solid line illustration of FIG. 2, lies practically flush with the other end of the body 10. When extended, to its dotted line position in FIG. 2, the hook is exposed by several inches and is prevented from further outward movement by a head 21 on the innermost end which will strike the transverse rivet or pin 19. If the rivet or pin 19 is not used, other means for interfering with further outward movement of the head 21 can be provided.

Finally, an auxiliary handle 22 comprising a rubber sleeve or equivalent material is placed circumjacent the body 10 and ferrule 12, as shown in FIG. 2.

The manner in which the tool is used is illustrated in FIGS. 3–5. In FIG. 3, the tool is shown as it would be used to adjust or unhitch the fifth-wheel connection between the truck and trailer by placing the hook 20 within the release eye of the standard hitch mechanism which is positioned underneath the trailer body. The length of the tool is designed so that the operator can comfortably reach this position, without the necessity of going under the truck and the weight of the tool is such that it is rugged enough to operate this mechanism without being unwieldly. FIG. 4 shows the manner in which the tool is used to check or "thump" truck tires which is commonly done procedure for the many tires on a semi-trailer rig and which must be repeated periodically over the road. In this operation, the operator may either grip the handle 11 and swing the tool against the tire or may grip the secondary handle 22 and use the tool as a conventional billy club to thump the tire. FIG. 5 illustrates the manner in which the depth gauge portion 13 is used by extending it so that the secions 14–16 extend beyond the end of the tool body 10 and are inserted into a fuel tank as shown. In this operation, the tool may be held by the handle 11, the secondary handle 22 and the weight 19 as desired, depending upon the position of the operator relative to the tank.

From the above description of a preferred embodiment, it can be seen that the tool of this invention is a simplified multi-purpose tool which can be used by the operator to perform the most common over-the-road operating checks which alleviates the necessity of a number of separate for this purpose. Other objects and advantages of the invention described will be apparent to those skilled in the art and variations may be made without departing from the scope of the attached claims.

I claim:

1. A combination tool for truck operators comprising in combination an elongate tubular rigid body, a pivoted handle at one end extending transversely normal to the axis of said body and movable from a position across said extended axis to either side thereof, a telescoping graduated depth gauge positioned on said rigid body at the handle end thereof and movable from a retracted position within said pivoted handle to an extended position beyond said pivoted handle when said pivoted handle has been pivoted to either side of said body axis, a second fixed handle circumjacent said one end of said body, a coaxially positioned cylindrical weight circumjacent said body at the other end thereof, and an extensible hook secured at said other end movable from a recessed position within said body and its cylindrical weight to an extended position axially outward from said other end of said body.

* * * * *